(12) United States Patent
Chang

(10) Patent No.: US 6,532,843 B2
(45) Date of Patent: Mar. 18, 2003

(54) STEERING WHEEL COVERING

(76) Inventor: Yih Jong Chang, PO Box 82-144, Taipei (TW)

( * ) Notice: Subject to any disclaimer, the term of this patent is extended or adjusted under 35 U.S.C. 154(b) by 50 days.

(21) Appl. No.: 09/817,280

(22) Filed: Mar. 27, 2001

(65) Prior Publication Data

US 2002/0139221 A1 Oct. 3, 2002

(51) Int. Cl.7 .................................................. B62D 1/06
(52) U.S. Cl. ........................................ 74/558; D12/176
(58) Field of Search ............................ 74/558, 558.5; D17/175, 176, 177

(56) References Cited

U.S. PATENT DOCUMENTS

| | | | | |
|---|---|---|---|---|
| 4,782,872 A | * | 11/1988 | Moschini | 74/558 |
| 5,213,007 A | * | 5/1993 | Yoo | 74/558 |
| 5,224,397 A | * | 7/1993 | Yoo | 74/558 |
| D342,925 S | * | 1/1994 | Brajcki | D12/176 |
| 5,287,767 A | * | 2/1994 | Engelstein | 74/558 |
| 5,393,298 A | * | 2/1995 | Chang | 601/134 |
| D364,372 S | * | 11/1995 | Shroitman | D12/177 |
| D436,068 S | * | 1/2001 | Stevens | D12/176 |

* cited by examiner

Primary Examiner—Matthew C. Graham
(74) Attorney, Agent, or Firm—Leong C. Lei

(57) ABSTRACT

A steering wheel covering includes a sheath fitting over the periphery of a motor vehicle, a plurality of detachable replaceable patches fitting respective recessed portions of the sheath, and a plurality of tie cords respectively inserted through wire holes of each patches to secure the patches and the sheath to the steering wheel.

1 Claim, 4 Drawing Sheets

STEERING WHEEL COVERING

BACKGROUND OF THE INVENTION

1. Field of the Invention

The present invention relates to a steering wheel covering for a motor vehicle and, more particularly, to such a steering wheel covering, which has a reusable major part and, can easily and positively be fastened to the steering wheel.

2. Description of the Prior Art

A regular steering wheel covering is comprised of a rubber inner layer and an outer layer of genuine or synthetic (for example, polyvinyl chloride) leather. The outer layer of genuine or synthetic leather is fastened to the rubber inner layer by stitches. Because the rubber inner layer is elastic, the steering wheel covering can easily be fastened to the steering wheel. However, because the steering wheel covering tends to slip on the steering wheel when the driver turns the steering wheel to control the steering direction of the motor vehicle, the steering wheel covering wears out quickly. There is another simple covering for steering wheel made of plastic leather or cowhide. During installation, a long tie cord is used to fasten the covering to the steering wheel. Because the tie cord must be wound round the covering from one end to the other, it takes much time and labor to complete the installation of the covering. Further, when the covering starts to wear, it cannot be used repeatedly and must be disposed of, thereby becoming a waste product and adding to the pollution of the environment.

SUMMARY OF THE INVENTION

The present invention relates to a steering wheel covering for a motor vehicle and, more particularly, to such a steering wheel covering, which has a reusable major part and, can be easily and positively fastened to the steering wheel.

It is one object of the present invention to provide a steering wheel covering which is environmentally friendly. It is another object of the present invention to provide a steering wheel covering, which is stable and safe in use. It is still another object of the present invention to provide a steering wheel covering, which is attractive and appealing to the beholder. It is still another object of the present invention to provide a steering wheel covering, which is easy to install. To achieve these and other objects of the present invention, the steering wheel covering comprises a sheath fitting over the periphery of the steering wheel of a motor vehicle, the sheath having a plurality of recessed portions, a plurality of patches respectively fitting the recessed portions of the sheath, the patches each having two long sides and two rows of wire holes respectively arranged along the long sides, and a plurality of tie cords respectively alternatively inserted through the rows of wire holes of each of the patches to secure the patches and the sheath to the steering wheel. By means of the aforesaid arrangement, the patches can be replaced with new ones or new versions of the patches either when they begin to wear, or at any time according to the inclination of the user.

The foregoing objects and summary provide only a brief introduction to the present invention. To fully appreciate these and other objects of the present invention as well as the invention itself, all of which will become apparent to those skilled in the art, the following detailed description of the invention and the claims should be read in conjunction with the accompanying drawings. Throughout the specification and drawings identical reference numerals refer to identical or similar parts.

Many other advantages and features of the present invention will become manifest to those versed in the art upon making reference to the detailed description and the accompanying sheets of drawings in which a preferred structural embodiment incorporating the principles of the present invention is shown by way of illustrative example.

DETAILED DESCRIPTION OF THE PREFERRED EMBODIMENT

Figure 1:
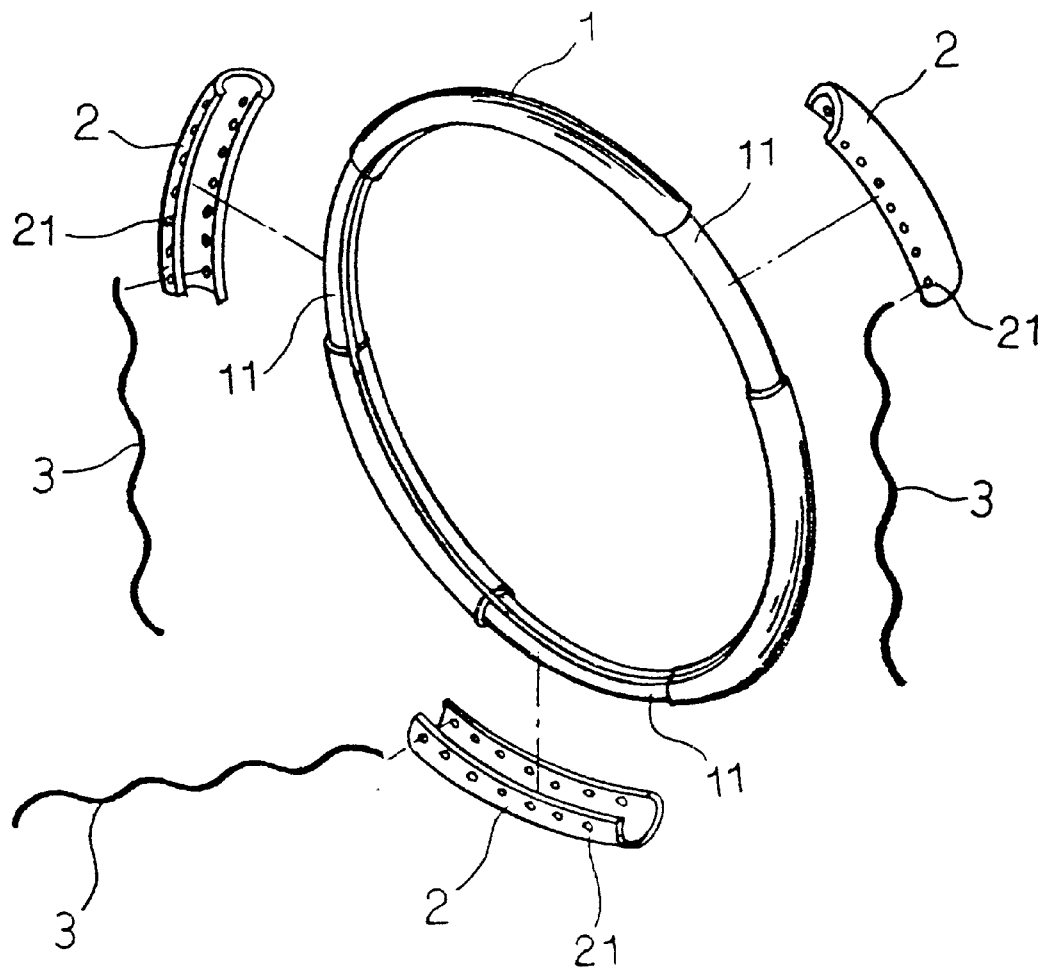
FIG. 1 is an exploded view of a steering wheel covering according to the present invention.

For the purpose of promoting an understanding of the principles of the invention, reference will now be made to the embodiment illustrated in the drawings. Specific language will be used to describe same. It will, nevertheless, be understood that no limitation of the scope of the invention is thereby intended, alterations and further modifications in the illustrated device, and further applications of the principles of the invention as illustrated herein being contemplated as would normally occur to one skilled in the art to which the invention relates.

Referring to FIG. 1, a steering wheel covering in accordance with the present invention is generally comprised of an annular sheath 1 fitting the periphery of the steering wheel, a plurality of patches 2, and a plurality of tie cords 3. The sheath 1 comprises a plurality of equiangularly spaced recessed portions 11. The packing elements 2 fit the recessed portions 11 of the sheath 1 respectively, each comprising two rows of wire holes 21 longitudinally arranged at two sides.

Figure 2:
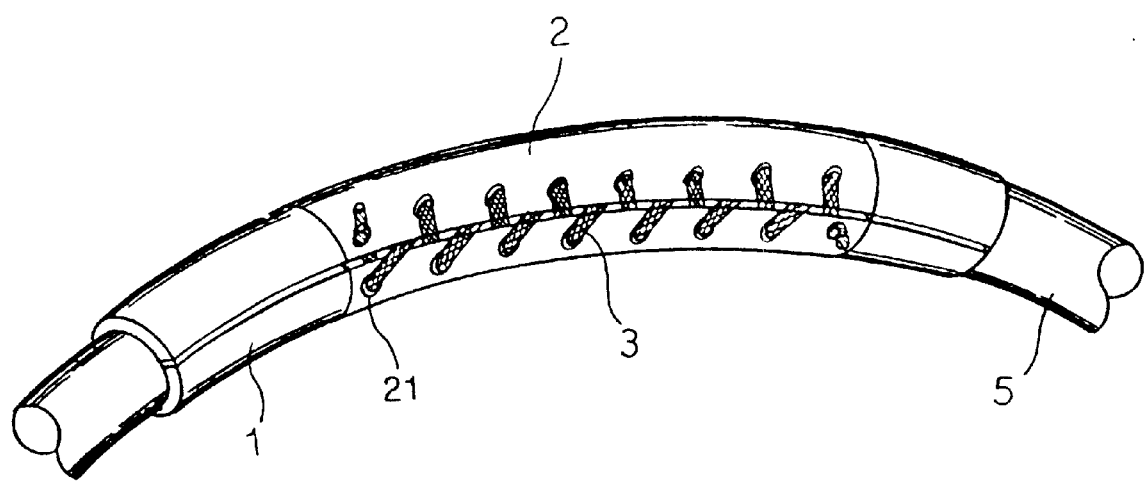
FIG. 2 is an installed view of a part of the present invention, showing the sheath covered on the steering wheel, the patch mounted on the sheath, and the tie cord fastened to the wire holes of the patch.
Figure 3:
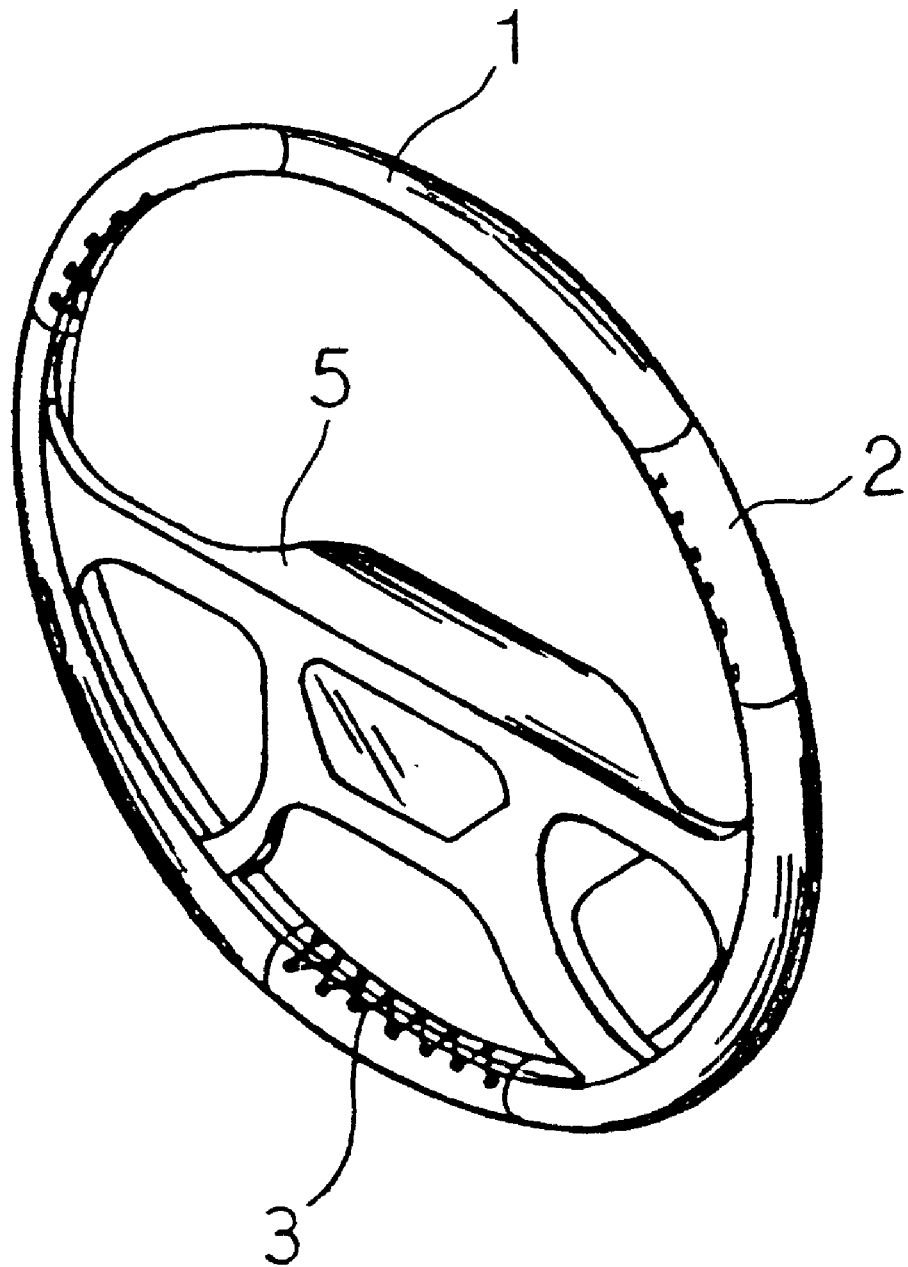
FIG. 3 illustrates the steering wheel covering installed in the steering wheel according to the present invention.

Referring to FIGS. 2 and 3, when in use, the sheath 1 is covered on the periphery of the steering wheel 5, and then the patches 2 are respectively mounted on the recessed portions 11, and then the tie cords 3 are respectively alternatively inserted through the rows of wire holes 21 of each of the patches 2 to join the two opposite long sides of each of the patches 2. When tied up each tie cord 3, the sheath 1 and the patches 2 are firmly secured to the steering wheel 5. After installation, the sheath 1 does not slip on the steering wheel 5 when the driver turns the steering wheel 5 to control the steering direction of the motor vehicle. If the patches 2 start to wear after long use of the steering wheel covering, or the user decides to replace the patches, the tie cords 3 are unfastened, and then the patches 2 are removed from the sheath 1 for a replacement. The sheath 1 can be re-used, thereby reducing the level of waste and achieving the invention's purpose of being environmentally friendly.

Figure 4:
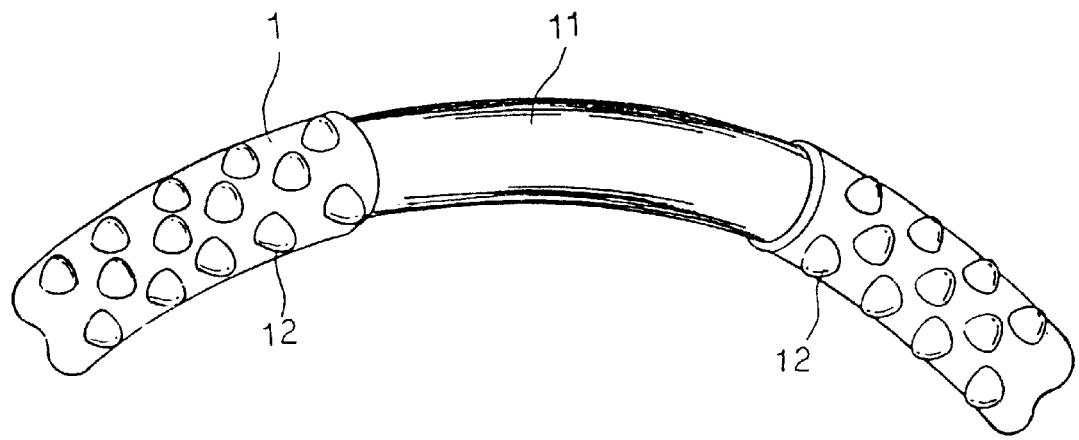
FIG. 4 illustrates an alternate form of the sheath for the steering wheel covering according to the present invention.

FIG. 4 shows an alternate form of the sheath 1. According to this embodiment, the sheath 1 has massaging members 12 protruded from the periphery.

Figure 5:
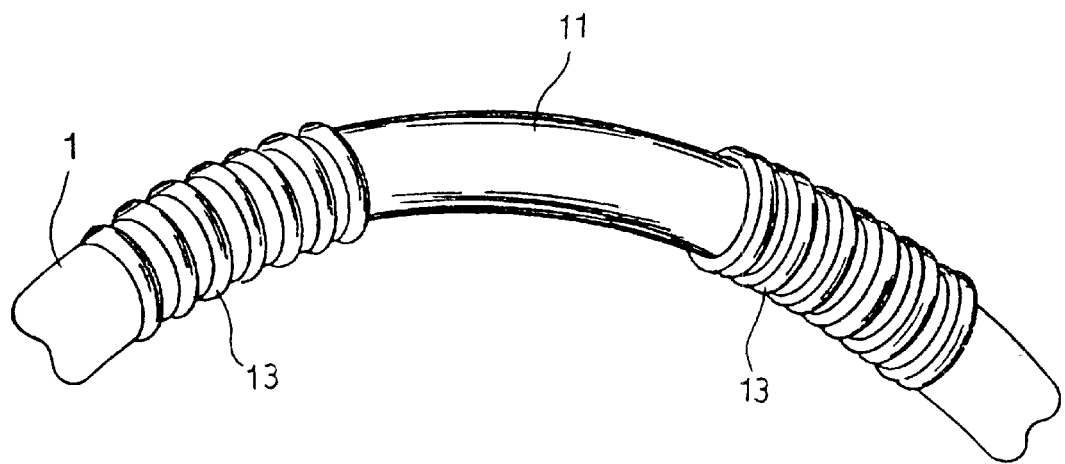
FIG. 5 illustrates another alternate form of the sheath for the steering wheel covering according to the present invention.

FIG. 5 shows another alternate form of the sheath 1. According to this embodiment, the sheath 1 comprises a plurality of annular flanges 13 spaced around the periphery for decoration as well as for positive gripping of the hands.

A prototype of steering wheel covering has been constructed with the features of FIGS. 1~5. The steering wheel covering functions smoothly to provide all of the features discussed earlier.

Although a particular embodiment of the invention has been described in detail for purposes of illustration, various modifications and enhancements may be made without departing from the spirit and scope of the invention. Accordingly, the invention is not to be limited except as by the appended claims.

I claim:

1. A steering wheel covering comprising:

a sheath fitting over the periphery of the steering wheel of a motor vehicle, said sheath comprising a plurality of recessed portions;

a plurality of patches respectively fitting the recessed portions of said sheath, said patches each having two long sides and two rows of wire holes respectively arranged along said long sides, each of said patches comprising a plurality of annular flanges disposed around the periphery and a plurality of massaging members protruded from the periphery thereof; and a plurality of tie cords respectively alternatively inserted through the rows of wire holes of each of said patches to secure said patches and said sheath to the steering wheel.

* * * * *